United States Patent
Fries

(10) Patent No.: US 11,896,160 B2
(45) Date of Patent: Feb. 13, 2024

(54) GRINDER HAVING BLOCKING ELEMENT

(71) Applicant: JOMA KUNSTSTOFFTECHNIK GMBH, Brunn am Gebirge (AT)

(72) Inventor: Rudolf Fries, Kaumberg (AT)

(73) Assignee: JOMA KUNSTSTOFFTECHNIK GMBH, Brunn am Gebirge (AT)

( * ) Notice: Subject to any disclaimer, the term of this patent is extended or adjusted under 35 U.S.C. 154(b) by 142 days.

(21) Appl. No.: 17/606,397

(22) PCT Filed: Apr. 24, 2020

(86) PCT No.: PCT/AT2020/060166
§ 371 (c)(1),
(2) Date: Oct. 25, 2021

(87) PCT Pub. No.: WO2020/215114
PCT Pub. Date: Oct. 29, 2020

(65) Prior Publication Data
US 2022/0192424 A1    Jun. 23, 2022

(30) Foreign Application Priority Data
Apr. 26, 2019   (AT) .............................. A 503842019

(51) Int. Cl.
*A47J 42/38*    (2006.01)
*A47J 42/04*    (2006.01)
(Continued)

(52) U.S. Cl.
CPC .............. *A47J 42/38* (2013.01); *A47J 42/04* (2013.01); *A47J 42/10* (2013.01)

(58) Field of Classification Search
CPC .. A47J 42/02; A47J 42/04; A47J 42/10; A47J 42/38; A47J 2201/00
See application file for complete search history.

(56) References Cited

U.S. PATENT DOCUMENTS

| 2,479,151 | A  | * | 8/1949 | Bostick | .................... | A47J 42/04 241/258 |
| 2002/0117566 | A1 | * | 8/2002 | Cheng | ..................... | A47J 42/08 241/169.1 |
| 2004/0182958 | A1 | * | 9/2004 | Herren | ..................... | A47J 42/08 241/169.1 |

FOREIGN PATENT DOCUMENTS

| DE | 27 47 059 | 5/1979 |
| DE | 103 07 930 | 9/2004 |

(Continued)

OTHER PUBLICATIONS

Int'l Search Report (Form PCT/ISA/210) conducted in Int'l Appln. No. PCT/AT2020/060166 (dated Jul. 21, 2020).
(Continued)

*Primary Examiner* — Matthew Katcoff
*Assistant Examiner* — Mohammed S. Alawadi
(74) *Attorney, Agent, or Firm* — GREENBLUM & BERNSTEIN, P.L.C.

(57) ABSTRACT

A grinder for a spice mill, in particular a hand-operated spice mill, having an inlet side for entry of unground grinding stock and an outlet side for the exit of ground grinding stock, including a rotor, a stator interacting with the rotor and a housing at least partially surrounding the rotor and/or stator. The housing includes a stator housing part, which is substantially rotationally fixedly connected to the stator, and a rotor housing part which is rotatable relative to the stator housing part and is substantially rotationally fixedly connected to the rotor via a connecting element. The connecting element is at least partially received in a recess in the rotor, and the connecting elements and the rotor are frictionally connected. The housing has, on a side of the rotor facing the inlet side, a blocking element which blocks displacement of the rotor in the direction of the inlet side.

14 Claims, 4 Drawing Sheets

(51) Int. Cl.
*A47J 42/10* (2006.01)
*A47J 42/02* (2006.01)

(56) References Cited

FOREIGN PATENT DOCUMENTS

| | | |
|---|---|---|
| DE | 10 2016 106 597 | 9/2016 |
| EP | 1 459 665 | 9/2004 |
| EP | 2 596 730 | 5/2013 |
| JP | H09-255012 | 9/1997 |
| JP | H11-91818 | 4/1999 |
| JP | 2013-014342 | 1/2013 |

OTHER PUBLICATIONS

Int'l Written Opinion (Form PCT/ISA/237) conducted in Int'l Appln. No. PCT/AT2020/060166 (dated Jul. 21, 2020).
Int'l Prelim. Exam. Report (Form PCT/IPEA/409) conducted in Int'l Appln. No. PCT/AT2020/060166 (dated Oct. 28, 2021).

* cited by examiner

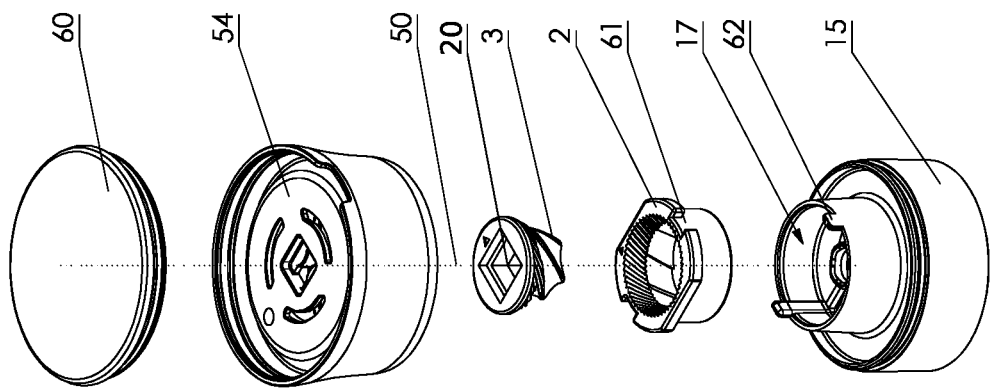

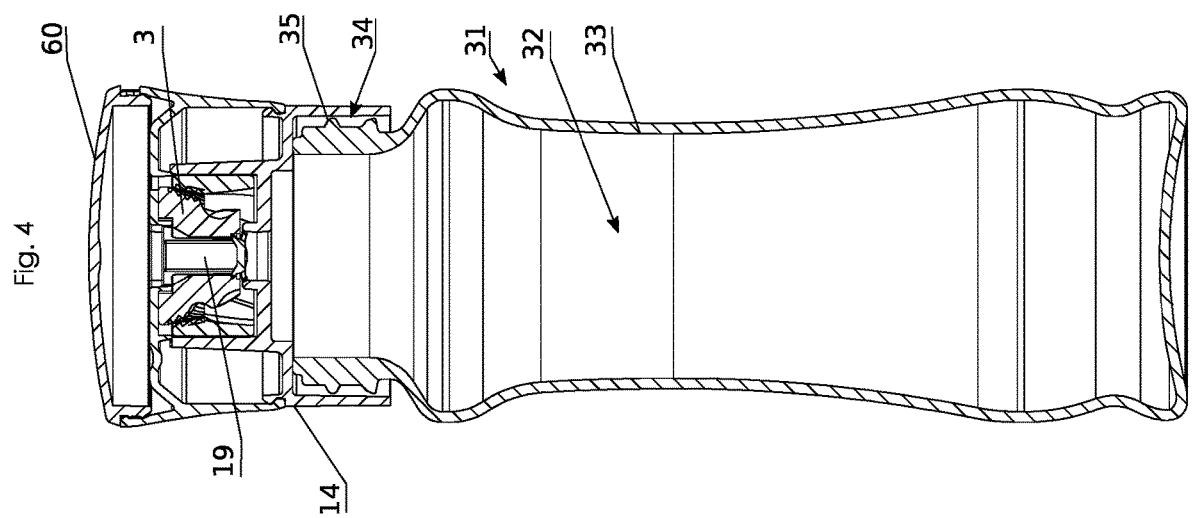

GRINDER HAVING BLOCKING ELEMENT

The invention relates to a grinder for a spice mill, in particular a manually-operated spice mill, with an inlet side for the entry of unground grinding stock, and an outlet side for the exit of ground grinding stock, comprising:
- a rotor,
- a stator, interacting with the rotor, and
- a housing, at least partially surrounding the rotor and/or the stator, wherein the housing has a stator housing part, which is connected to the stator in an essentially rotationally fixed manner, and a rotor housing part, which can be rotated relative to the stator housing part, and is connected to the rotor in an essentially rotationally fixed manner by way of a connecting element, wherein the connecting element is at least partially accommodated in a recess in the rotor.

The invention furthermore relates to a spice mill with an accommodating chamber for spices, in particular an accommodating container.

To avoid plastic abrasion, ceramic grinders are increasingly being used in spice mills. However, ceramic grinders have the disadvantage that their components are subject to greater manufacturing variations than is the case with pure plastic grinders. These manufacturing variations can not only make it difficult to assemble the grinder, but later in use can also lead to the rotor detaching from the rotor mounting and being displaced towards the inlet side, so that the grinding gap between the rotor and the stator is subsequently narrowed and, in the worst case, the grinder can no longer be used, or can only be used to a limited extent. It would therefore be desirable to create a grinder that can easily be assembled, despite manufacturing variations, and can continue to be used even in the event of an inadvertent detachment of the rotor from the rotor mounting.

A grinder made of ceramic is of known art from, among other sources, the patent application DE 10 2016 106 597 A1. This discloses a spice mill in which a grinding cone (rotor) with a through-passage hole is clipped onto centring and latching lugs extending in the direction of a grinding stock container, such that a form-fit connection is created between a grinder cap and the grinding cone. However, what is disadvantageous is that to compensate for manufacturing variations, the centring and latching lugs must be designed to be relatively wide at their ends in order to hold rotors with through-passage holes that are too large in diameter. This in turn leads to the fact that, in the case of rotors with narrow through-passage holes, the centring and latching lugs cannot be implemented, or can only be implemented with difficulty.

From JP 2013014342 A a spice mill is furthermore of known art, which has a connecting element between a recess of the rotor and the rotor housing part, wherein this connecting element holds the rotor in its vertical position. The connecting element is fixed by means of a fixing element by way of a screwed connection from the upper face.

JP 2906335 B2 and JP 2943103 B2 in each case show a spice mill, in which a blocking element is connected to the stator housing by means of connecting webs. A connecting web with a recess is provided on the lower face. With the aid of this web of the rotor housing, the rotor is held in a contact region. The rotor has a recess, into which a metal pin is inserted by way of the blocking element, wherein the metal pin is accommodated on the lower face in a recess of the connecting web.

From EP 2 596 730 A1 a spice mill is of known art, in which the rotor is mounted on a connecting element such that it can be displaced, and with the aid of an adjusting or lifting element can be displaced against the force of a spring.

EP 1 459 665 A1 and US 2002/117566 A1 also show spice mills with a centre pin, on which a rotor is pressed downwards with the aid of a spring, wherein an adjustable lifting seat is provided, with which the rotor can be moved upwards against the force of the spring on the centre pin.

It is therefore the object of the present invention to alleviate, or completely eliminate, the disadvantages of the prior art. In particular, it is the object of the invention to provide a grinder that is insensitive to manufacturing variations in the dimensions of the components, in particular of the rotor, and which therefore remains functional, even in the event of any displacement of the rotor.

This object is achieved by a grinder of the type stated in the introduction, with the features of claim 1. The inventive grinder is thus characterized by the fact that the connecting element and the rotor are frictionally connected, wherein the housing has a blocking element on a side of the rotor facing towards the inlet side, which blocking element blocks a displacement of the rotor in the direction of the inlet side.

Advantageously, in the event of a displacement of the rotor from its original position, the inventive blocking element prevents the rotor from penetrating too deeply into the stator, so that the grinder remains functional, despite this displacement. Furthermore, it is now possible to use rotors which, due to manufacturing variations, do not exactly match the dimensions of the rotor mounting of the housing, and should therefore have been rejected because of the risk of an immediate detachment from the rotor mounting. By means of the inventive blocking element, a limit is set, so to speak, up to which the rotor can be displaced, or can penetrate into the stator, without impairing the function of the grinder. Accordingly, the blocking element is advantageously designed such that it keeps the rotor at a distance from the stator. In particular in the combination of ceramic rotors and ceramic stators, but also rotors/stators made of metal with plastic housings, this results in the advantage that the blocking element can be positioned relatively precisely in the housing, since plastic housings are usually manufactured in an injection molding process, and are thus subject to manufacturing variations that are minor compared to those of ceramic/metallic components. The blocking element can also be designed such that it necessarily holds the rotor in the original position by means of touching contact. In other words, this means that the blocking element can either be a short distance from the rotor in its original position on the rotor mounting, or there can be touching contact between the rotor and the blocking element.

The blocking element is preferably made of the same material as the housing, and expediently can be formed in one piece with the latter. As already stated, in the assembled state of the grinder a small distance or clearance can be present between the blocking element and the rotor, so that the rotor is not, or at least not permanently, in contact with the blocking element. This is the case, for example, if the dimensions of the rotor correspond exactly to the dimensions of the rotor mounting and therefore no displacement of the rotor takes place. The size of the clearance depends on the manufacturing variations and any displacement that has already occurred. Preferably, however, the clearance between the rotor and the blocking element is less than 2 mm, in particular less than 1 mm, particularly preferably less than 0.5 mm. If there is no clearance (for example, if the rotor has become detached from the rotor mounting and has been displaced in the direction of the inlet side), the face of the rotor facing towards the inlet side is in contact with the blocking element. However, rotation is still possible in this case.

The rotor of the grinder is preferably designed in the form of a truncated cone, and is arranged within the stator. Between the stator and the rotor there is a peripheral grinding gap, which preferably narrows from the inlet side to the outlet side. On its peripheral surface, the rotor has a plurality of grinding projections that interact with grinding projections of the stator and, by means of rotation, grind the grinding stock that enters the grinder on the inlet side. The grinding projections of the stator and the rotor can each be formed by teeth that form pointed edges, corners and/or acute-angled undercuts. The teeth can cut the grinding stock to be ground, which has a beneficial effect on the preservation of aromas in the grinding stock. Alternatively, the grinding protrusions can be free of sharp edges, corners and/or acute-angled undercuts and can have a radius of curvature of at least 0.1 mm. In this embodiment of the grinding protrusions, the grinding stock is crushed, which further reduces the abrasion of the grinder.

In addition to the stator and the rotor, which are preferably each made of ceramic or metallic material, in particular a ceramic material with a high alumina content which is preferably at least 85%, the grinder has a housing which at least partially surrounds the stator and/or the rotor. The housing preferably consists of a thermoplastic material. This can have both a semi-crystalline and also an amorphous structure. The housing can have an accommodation element for the stator, and a rotor mounting for the rotor. The housing preferably surrounds the rotor and the stator on all sides and/or completely, except for openings for unground grinding stock on the inlet side and ground grinding stock on the outlet side. On the outlet side of the grinder, the housing can have an upper housing part with openings, through which the ground grinding stock passes out of the grinder.

In a preferred form of embodiment, provision can be made for the blocking element to be designed as a connecting web, which connects at least two, in particular oppositely located, points of the housing to each other. By virtue of being connected to the housing at least twice, the blocking element achieves an increased stability. Needless to say, the blocking element designed as a connecting web can also be connected to the housing at more than two points. For example, the connecting web can be designed in the form of a star, wherein the ends are connected to the housing. Preferably, however, the connecting web only connects two oppositely located sides of the housing.

In order better to support the rotor in the event of displacements, provision can be made for the blocking element for the support of an upper face of the rotor to have a preferably essentially round, in particular circular, supporting element, which preferably has a through-passage hole. Here the upper face of the rotor is the side of the rotor facing towards the inlet side of the grinder. If the rotor is designed in the form of a truncated cone, the upper face of the rotor is the top surface of the truncated cone with the smaller size. The support element is set up for the purpose of supporting and blocking the upper face of the rotor. If a through-passage hole is provided in the support element, this facilitates the assembly of the rotor, and also has the advantage that less, or in actual fact no, grinding stock, becomes wedged between the rotor and the blocking element. This prevents abrasion, in particular abrasion of the blocking element.

In order to facilitate the manipulation of the grinder, the housing has a stationary stator housing part, which is connected to the stator in a rotationally fixed manner, and a rotor housing part, which can be rotated relative to the stator housing part, and is connected to the rotor in a rotationally fixed manner by way of a connecting element, wherein the connecting element is at least partially accommodated in a recess in the rotor. Accordingly, the housing consists of two parts which can be rotated relative to each other. At the same time the stator can be accommodated in a rotationally fixed manner in an accommodation element of the stator housing part. In order to ensure a rotationally fixed connection between the stator and the stator housing part, the stator can have at least one, preferably two, attaching section(s), to which (in each case) an attaching element of the stator housing part is/are connected. A tongue can be provided as an attaching element which is arranged on one end face of the accommodation element of the stator housing part. The attaching section can be designed as an attaching recess, in which the attaching element is accommodated. The connecting element, which is inserted into the recess of the rotor, is preferably manufactured in one piece with the rotor housing part. The connecting element can be designed as a pin, the cross-sectional shape of which preferably deviates from a circular shape. The type of connection of the connecting element to the rotor is a frictional connection. The rotor mounting stated above is here formed by the connecting element.

As stated, if individual components of the grinder, such as the rotor, are made of a ceramic or metallic material, they can be subject to greater manufacturing variations. The connecting elements, on the other hand, which are usually made of a plastic, can be manufactured more precisely, and are therefore subject to significantly less manufacturing variations. Therefore, if the recess of a rotor made of ceramic/metallic material turns out to be too large in the manufacture, it can happen that the rotor detaches from the connecting element in the course of time, and is displaced towards the inlet side of the grinder. This can reduce the grinding gap to such an extent that the grinding throughput is reduced, or the grinder even becomes completely unusable. The inventive blocking element can be used to remedy this problem in particular.

The stator housing part and the rotor housing part can be rotatably connected to each other by way of a latching connection. For this purpose, the stator housing part and/or the rotor housing part can have corresponding latching tongues. Preferably, however, provision is made for one of the housing parts, in particular the stator housing part, to have a peripheral latching groove with which at least two latching tongues, or a peripheral thickened element of the other housing part, in particular the rotor housing part, can engage.

In order to supply the inlet side with grinding stock, provision can be made for the stator housing part to have a connecting section, in particular a threaded section, for connection to a container. The connecting section is located on the inlet side of the grinder. As an alternative to the threaded section, a latching connection, or another type of connection, could also be used.

In one form of embodiment, a channel, preferably with essentially straight-walled inner surfaces, can be provided as a recess of the rotor, which channel extends from an upper face of the rotor to a lower face of the rotor. In this context, straight-walled means that there is no tapering of the channel between the upper and lower faces of the rotor. A channel that in some sections is curved in cross-section thus also falls under the term straight-walled. The channel is preferably free of indentations, wherein indentations are understood to be recesses and openings that would allow a latching connection between the connecting element and the channel.

Provision is preferably made for the blocking element to be connected to the stator housing part. This facilitates the manufacture of the grinder.

In order to connect the rotor to the rotor housing part in an essentially rotationally fixed manner, it is beneficial if the connecting element has a cross-section deviating from a circular shape, in particular it has a polygonal, preferably a quadrilateral, cross-section.

The recess in the rotor can expediently have a cross-section essentially corresponding to the cross-section of the connecting element, in particular it has a polygonal, preferably a quadrilateral, cross-section. In other words, the cross-section of the recess and the cross-section of the connecting element are preferably essentially identical.

In order to attach the rotor to the connecting element, the connecting element can have at least one projection which lies in the recess on an inner face of the rotor and creates a frictional connection between the rotor and the connecting element. The inner face of the rotor is formed by the walls of the recess. In the case of a channel as the recess, the inner face of the rotor is formed by the inner surface of the channel. The projection exerts a radially outward force on the inner face of the rotor, as viewed from the connecting element, so that a frictional or force-fit connection is created. Two projections are preferably provided, in particular on oppositely located sides of the connecting element.

In order to facilitate the insertion of the connecting element into the rotor, it is beneficial if the projection is elastically deformable and is bent for the purpose of the frictional connection, so that a force is exerted on the inner face of the rotor. Here the projection is bent by the insertion of the connecting element into the recess of the rotor. By virtue of its elasticity, the projection exerts a (frictional) force onto the inner face of the rotor.

In a preferred form of embodiment, provision can be made for the rotor and the stator to be made of a ceramic or metal material. Ceramic and metal have the advantage that hardly any abrasion occurs during grinding that could enter into the food, together with the grinding stock.

The invention also relates to a spice mill with an accommodating chamber, in particular an accommodating container, for spices, characterized in that the spice mill has a grinder of the type described and the grinder is connected to the accommodating chamber. The accommodating chamber can in particular be made of glass or plastic. For purposes of connection, in particular, a threaded section, or a latching connection can be provided. With regard to the features and advantages, reference is made to the description in connection with the grinder.

Preferred forms of embodiment of the invention are described in more detail below by means of figures, to which, however, it is not intended to be limited.

FIG. 3 shows an exploded view of the inventive grinder.

FIG. 4 shows an inventive spice mill with the inventive grinder.

Figure 1:
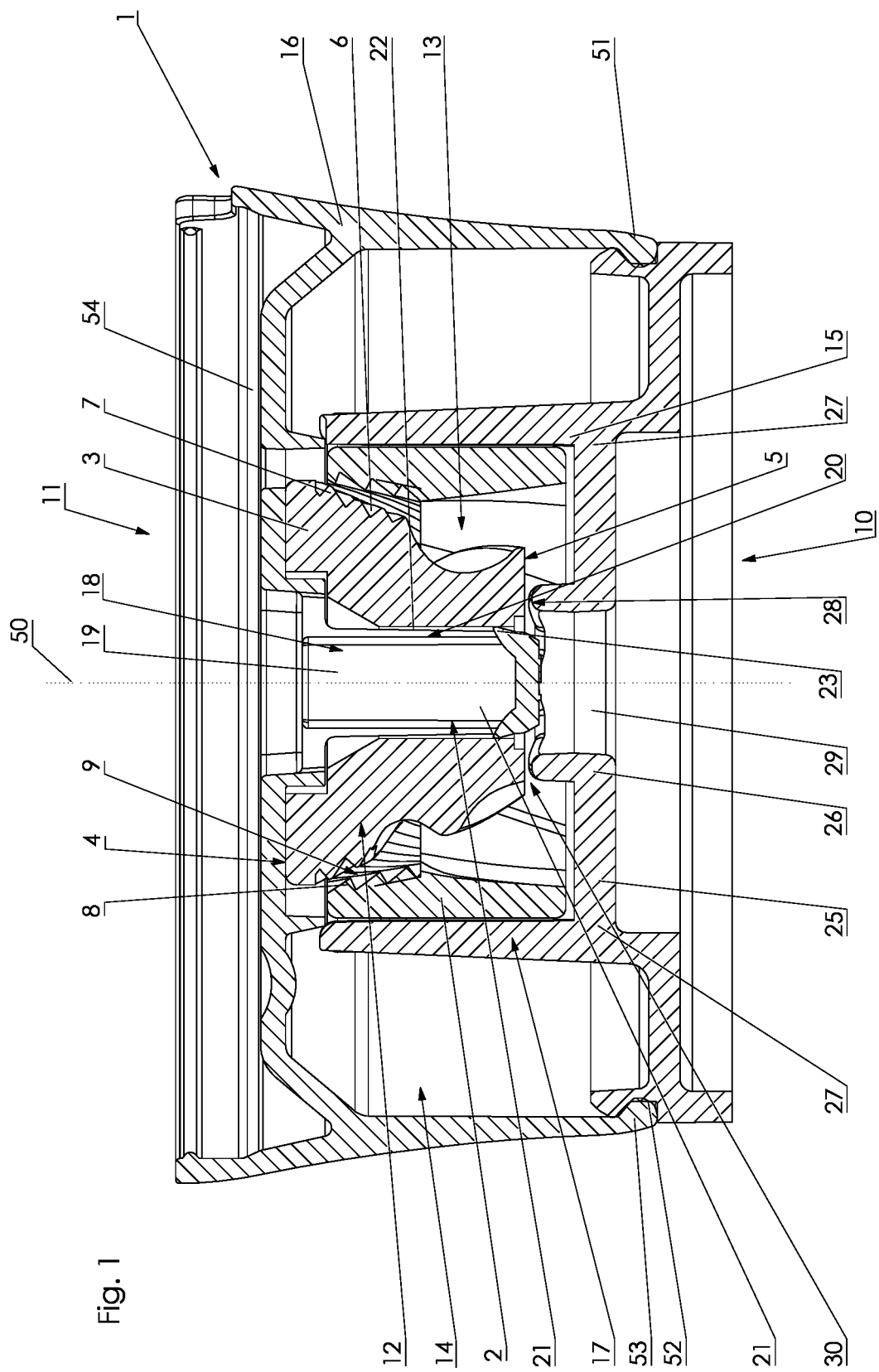
FIG. 1 shows a cross-sectional view of the grinder according to the invention.

FIG. 1 shows the inventive grinder 1 in a cross-sectional view in the assembled state. The grinder 1 has a stator 2 and a rotor 3, which is accommodated in the stator 2. Both the rotor 3 and the stator 2 consist of a ceramic material in the embodiment shown. The stator 2 is embodied as a ring, which completely surrounds the rotor 3. The rotor 3 has the form of a truncated cone, and tapers from a lower face 4 to an upper face 5. The rotor 3 has a multiplicity of grinding projections 7 on its peripheral surface 6, which interact with grinding projections 8 of the stator 2, so as to comminute a grinding stock (not shown). The grinding projections 8 of the stator 2 and the grinding projections 7 of the rotor 3 are helically twisted about a longitudinal axis 50 of the grinder 1, so as to facilitate the guidance of the grinding stock. Between the rotor 3 and the stator 2 there is a grinding gap 9, which narrows from an inlet side 10, at which the unground grinding stock is supplied, to an outlet side 11, at which the ground grinding stock leaves the grinder 1 once again. The stator 2 and the rotor 3 each have two different regions in which the grinding projections 7 and 8 are designed in a different manner. In a lower region 12, facing towards the outlet side 11, the grinding projections 7 and 8 are finer and more pointed than in an upper region 13, facing towards the inlet side 10. The number of grinding projections 7 and 8 is also higher in the lower region 12 than in the upper region 13. The upper face 5 of the rotor 3 faces towards the inlet side 10.

As can be seen in FIG. 1, the stator 2 and the rotor 3 are surrounded by a housing 14. The housing 14 has a stator housing part 15 and a rotor housing part 16, wherein the rotor housing part 16 can be rotated relative to the stator housing part 15. The stator housing part 15 is connected to the rotor housing part 16 by way of a latching connection 51. In FIG. 1 it can be seen that the stator housing part 15 has a peripheral, preferably outwardly pointing detent groove 52 for this purpose, with which a peripheral, preferably inwardly pointing thickened element 53 of the rotor housing part 16 engages. Needless to say, provision can also be made for the rotor housing part 16 to have the detent groove 52, and for the stator housing part 15 to have the thickened element 53. The rotor housing part 16 can have an upper housing part 54 on the outlet side 11 with openings (not shown), through which the ground grinding stock can pass.

The stator housing part 15 is connected to the stator 2 in an essentially rotationally fixed manner. For this purpose, the stator housing part 15 forms an accommodation element 17, preferably in the form of a cylindrical jacket, in which the stator 2 is accommodated in an essentially rotationally fixed manner. In addition, the stator 2 can have at least one attaching recess 61, in which a tongue 62 of the stator housing part 15 is accommodated (cf. FIG. 3). The rotor housing part 16 has a rotor mounting 18 in the form of a connecting element 19, which is inserted into a recess 20 of the rotor.

The connecting element 19 can be designed as a pin. The connecting element 19 can be connected to the upper housing part 54. In the figures the recess 20 is formed by a channel 21 with straight-walled inner surfaces 22, which runs through the rotor 3 from the upper face 5 to the lower face 4, and can be accessed from both faces (upper face 5 and lower face 4). The connecting element 19 passes through the entire channel 21. In order to connect the rotor 3 to the rotor housing part 16 in an essentially rotationally fixed manner, the connecting element 19 and the recess 20 have essentially the same cross-section, which preferably deviates from a circular shape. By virtue of the resulting form fit, a rotation of the rotor housing part 16 causes the rotor 3 also to rotate. In the form of embodiment shown, both the connecting element 19 and the recess 20 have a quadrilateral cross-section. In addition, the connecting element 19 can have at least one projection 23, which is elastically deformable and, as a result of the deformation, exerts a force acting radially outwards on the inner surface 22 of the channel 21, that is to say, on an inner face of the rotor 3, such that a frictional connection is created between the connecting element 19 and the rotor 3.

Ceramic components such as the stator 2 or the rotor 3 are sometimes subject to non-negligible manufacturing variations with regard to their dimensions. For this reason, it can happen that the rotor 3 becomes detached from the connecting element 19 and is displaced in the direction of the inlet side 10, as a result of which the grinding projections 7 of the rotor 3 can become wedged together with the grinding projections 8 of the stator 2, so that the grinder 1 can no longer be used. In order to prevent this, in accordance with the invention a blocking element 25 is provided, which blocks a displacement of the rotor 3 (too deep) into the stator 2. In the embodiment shown, the blocking element 25 is designed as a straight connecting web 26, which connects two opposing points 27 of the housing 14, in particular of the stator housing part 15, to each other. The blocking element 25 is connected to the stator housing part 15, and is preferably arranged below the accommodation element 17 for the stator 2. Centrally above the rotor 3, the blocking element 25 forms a bearing surface 28 with a through-passage hole 29 located therein. The bearing surface is raised in the direction of the rotor 3, compared to the rest of the blocking element 25. In the embodiment shown there is a clearance 30 between the blocking element 25 and the upper face 5 of the rotor 3. This clearance 30 is preferably less than 2 mm, in particular less than 1 mm, particularly preferably less than 0.5 mm. Accordingly, in the form of representation shown the rotor 3 is not in contact with the blocking element 25. The fact that the rotor 3 is not in contact with the blocking element 25 in the representation shown is due to the fact that the rotor is held in the intended position by the frictional connection with the projection 23. However, in long-term operation (or due to manufacturing variations), it could happen that the rotor 3 is displaced in the direction of the inlet side 10. Without the blocking element 25, the rotor 3 would become wedged together with the stator 2, so that the grinder 1 would no longer be usable, or only usable to a limited extent. However, the blocking element 25 prevents the rotor 3 from too great a displacement, so that the grinder 1 remains usable even over a long period of time.

Figure 2:
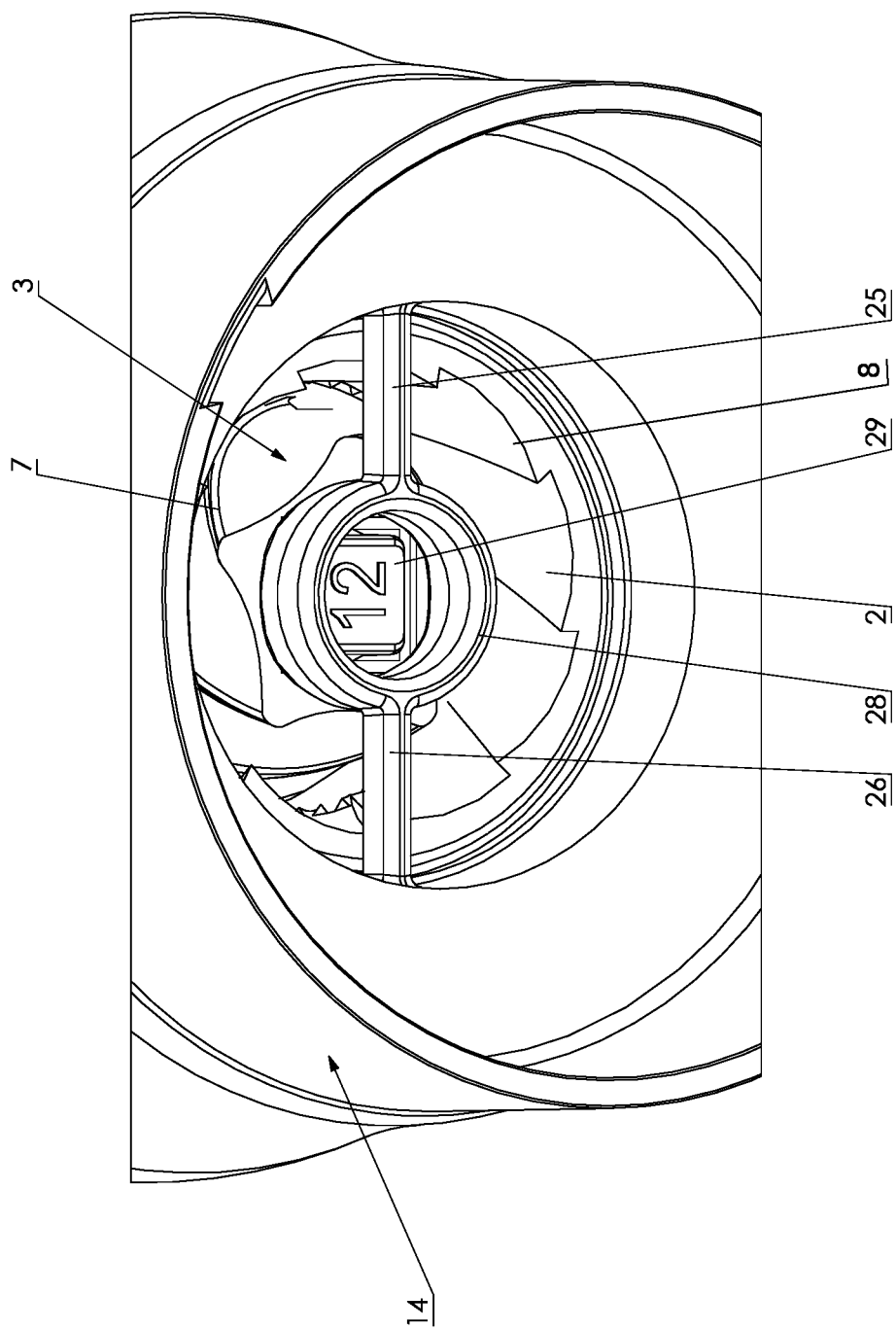
FIG. 2 shows the inventive grinder in an oblique view from above.

FIG. 2 shows the grinder in an oblique view from above. In this view, the through-passage hole 29 in the bearing element 28 is clearly visible.

FIG. 3 shows an exploded view of the inventive grinder 1, wherein the individual parts are depicted along the longitudinal axis 50.

FIG. 4 shows a spice mill 31 with the inventive grinder 1, and an accommodating chamber 32 for spices in the form of an accommodating container 33. Furthermore, a removable cap 60 can be seen. For connection to the accommodating container 33, the housing 14 has a connecting section 34, in particular a threaded section 35, on the stator housing part 15.

The invention claimed is:

1. A grinder for a spice mill, with an inlet side for entry of unground grinding stock, and an outlet side for exit of ground grinding stock, comprising:
   a rotor,
   a stator, interacting with the rotor, and
   a housing, at least partially surrounding the rotor and/or the stator, wherein,
   the housing has a stator housing part, which is connected to the stator in an essentially rotationally fixed manner, and a rotor housing part, which can be rotated relative to the stator housing part, and is connected to the rotor in an essentially rotationally fixed manner by way of a connecting element, wherein
   the connecting element is at least partially accommodated in a recess of the rotor,
   wherein,
   the connecting element and the rotor are frictionally connected, and in the event of manufacturing variations the rotor can be detached from the connecting element and can be displaced in a direction of the inlet side, wherein
   the housing has, on a side of the rotor facing towards the inlet side, a blocking element, which blocks a displacement of the rotor in the direction of the inlet side.

2. The grinder according to claim 1, wherein:
the blocking element is designed as a connecting web, which connects at least two points of the housing to one another.

3. The grinder according to claim 1, wherein:
the blocking element, for supporting of an upper face of the rotor, has a supporting element, which has a through-passage hole.

4. The grinder according to claim 1, wherein:
the stator housing part and the rotor housing part are rotatably connected to each other by way of a latching connection.

5. The grinder according to claim 1, wherein:
the stator housing part has a connecting section for connection to an accommodating container.

6. The grinder according to claim 1, wherein:
the recess of the rotor is designed as a channel, which channel extends from an upper face of the rotor to a lower face of the rotor.

7. The grinder according to claim 1, wherein:
the blocking element is connected to the stator housing part.

8. The grinder according to claim 1, wherein:
the connecting element has a polygonal cross-section.

9. The grinder according to claim 8, wherein:
the recess in the rotor has a cross-section essentially corresponding to the polygonal cross-section of the connecting element.

10. The grinder according to claim 1, wherein:
the stator is accommodated in a rotationally fixed manner in an accommodation element in the stator housing part.

11. The grinder according to claim 1, wherein:
the connecting element has at least one projection which lies in the recess of the rotor on an inner face of the rotor, and establishes the frictional connection between the rotor and the connecting element.

12. The grinder according to claim 11, wherein:
the at least one projection is elastically deformable, and is bent for the purpose of the frictional connection, such that a force is exerted on the inner face of the rotor.

13. The grinder according to claim 1, wherein:
the rotor and the stator are made of a ceramic material and/or a metal.

14. The spice mill with an accommodating chamber for spices, wherein:
the spice mill comprises the grinder according to claim 1, and the grinder is connected to the accommodating chamber.

* * * * *